US006892017B2

(12) United States Patent
Takahashi et al.

(10) Patent No.: US 6,892,017 B2
(45) Date of Patent: May 10, 2005

(54) OPTICAL FIBER AND OPTICAL TRANSMISSION SYSTEM USING THE OPTICAL FIBER

(75) Inventors: Fumio Takahashi, Tokyo (JP); Yoshihisa Suzuki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/602,645

(22) Filed: Jun. 25, 2003

(65) Prior Publication Data

US 2004/0096171 A1 May 20, 2004

(30) Foreign Application Priority Data

Jun. 28, 2002 (JP) ....................................... 2002-190265

(51) Int. Cl.[7] ................................................ G02B 6/16
(52) U.S. Cl. ....................... 385/123; 385/124; 385/126; 385/128
(58) Field of Search ................................ 385/123, 124, 385/126, 128

(56) References Cited

U.S. PATENT DOCUMENTS

| | | | |
|---|---|---|---|
| 5,905,838 A | | 5/1999 | Judy et al. |
| 6,072,929 A | | 6/2000 | Kato et al. |
| 6,360,045 B1 | * | 3/2002 | Shoval et al. ............... 385/123 |
| 6,415,089 B2 | * | 7/2002 | Kato et al. .................. 385/123 |
| 2002/0102082 A1 | * | 8/2002 | Sarchi et al. ............... 385/123 |
| 2004/0213531 A1 | * | 10/2004 | Sasaoka ..................... 385/123 |

* cited by examiner

*Primary Examiner*—Frank G. Font
*Assistant Examiner*—Derek L. Dupuis
(74) *Attorney, Agent, or Firm*—Oblon, Spivak, McClelland, Maier & Neustadt, P.C.

(57) ABSTRACT

An optical fiber characterized by a dispersion of not less than 2 ps/nm/km and not more than 10 ps/nm/km at a wavelength of 1550 nm, an effective area of 65 $\mu m^2$ or more at a wavelength of 1550 nm, a positive dispersion slope at a wavelength of 1550 nm, a zero dispersion wavelength outside the wavelength range of 1400 nm to 1460 nm, an absolute value of dispersion of not less than 2 ps/nm/km and not more than 10 ps/nm/km at a wavelength of 1400 nm, a cutoff wavelength of 1400 nm or shorter, and a transmission loss of 0.40 dB/km or less at a wavelength of 1400 nm is provided. By using the optical fiber of the present invention, the WDM transmission both in the 1.55 $\mu m$ wavelength band and in the wavelength range between 1400 nm to 1460 nm is realized.

5 Claims, 2 Drawing Sheets

(A)

(B)

OPTICAL FIBER AND OPTICAL TRANSMISSION SYSTEM USING THE OPTICAL FIBER

FIELD OF THE INVENTION

This invention relates to an optical fiber suitable as an optical transmission line in wavelength division multiplexing (WDM) transmissions, and an optical transmission system using the optical fiber.

BACKGROUND OF THE INVENTION

Conventionally, the technology of using the light in the 1.31 μm or 1.55 μm wavelength band as signal light in the optical communications is well established. The optical fiber, which is mainly used as an optical transmission line in optical communication, is a standard Single Mode Fiber (SMF) having zero dispersion wavelength in the 1.31 μm band (1.31 μm band is defined as the wavelength range of 1300 nm–1324 nm, hereinafter).

Meanwhile, since the transmission loss of the silica based optical fiber becomes minimum in the 1.55 μm band and the Erbium Doped Fiber Amplifier (EDFA) can carry out high efficient optical amplification in the 1.55 μm band, the Dispersion Shifted Fiber (DSF) having zero dispersion wavelength in the 1.55 μm band has been widely introduced. (1.55 μm band is defined as the wavelength range of 1530 nm–1570 nm, hereinafter.)

The so-called dual shape profile consisting of a first core at the center and a second core having a refractive index lower than that of the first core surrounding the first core is generally deployed as the refractive index profile of the core of DSF.

In recent years, rapidly increasing the information traffic due to the advance of the information technology, WDM transmission has been widely introduced into the telecommunications field. The optical fiber for WDM transmission is required to have low transmission loss. Moreover, in order to prevent the noise generation by nonlinear phenomenon such as four-wave mixing (FWM) etc., it is also important that the absolute value of the dispersion should not be too small in the operating wavelength band.

Furthermore, in order to suppress the wave distortion of the signal light due to the accumulative dispersion, it is also important that the absolute value of the dispersion is not too high.

As one solution of the optical fiber to prevent the above-mentioned noise generation by FWM, a non-zero dispersion shifted fiber (NZ-DSF), in which the refractive index profile of the conventional DSF is adjusted and the zero dispersion wavelength slightly shifted to the longer or shorter side of 1550 nm, is developed and commercialized.

In addition to FWM, there are a self-phase modulation (SPM), a cross phase modulation (XPM), etc. in a nonlinear phenomenon which are known to be proportional to the optical power density in the core of the optical fiber.

Even if NZ-DSF could suppress the FWM, distortion of the signal waveform by SPM and XPM is generated easily. This is because the optical power density in the core easily increases since the mode field diameter (MFD) of NZ-DSF is comparatively small.

Although longer distance transmission with many wavelengths requires higher optical power input, the optical power density can be reduced by enlarging an effective area (Aeff), which can result in reducing the waveform disorder by the nonlinear phenomenon.

Therefore, the optical fiber having a higher effective area and a moderate dispersion in the operating wavelength range is preferable to suppress the nonlinear phenomenon.

The optical fiber in which the generation of the above-mentioned nonlinear phenomenon is suppressed and the distortion of the signal light caused by the nonlinear phenomenon decreased, by enlarging Aeff more than about 70 μm$^2$, is disclosed in U.S. Pat. No. 6,072,929.

Meanwhile, further expansion of the communication information capacity is required, and in addition, the attempt to enhance the operating wavelength band is investigated. The U.S. Pat. No. 5,905,838 discloses the optical fiber that enables WDM transmission in both the 1.31 μm and 1.55 μm wavelength bands.

In the optical fiber disclosed by the U.S. Pat. No. 5,905,838, the zero dispersion wavelength was shifted into the range between 1350 nm and 1450 nm and the absolute value of dispersion is made small in both the 1.31 μm and 1.55 μm band by reducing the dispersion slope in both the wavelength bands.

SUMMARY OF THE INVENTION

However, generally, if the dispersion slope is reduced, Aeff also tends to become small. In the above-mentioned technique for shifting the zero dispersion wavelength between 1350 nm and 1450 nm and reducing the dispersion slope, Aeff must be reduced to 50 μm$^2$ or less. Therefore, the distortion of the signal light caused by nonlinear phenomenon cannot be reduced.

Moreover, the cutoff wavelength cannot help being 1300 nm or less when transmission in the 1.31 μm band is taken into consideration. In general, the bending loss tends to increase when the cutoff wavelength is small, and increase of the loss by the bending loss tends to be large in the long wavelength side. Therefore, when the cutoff wavelength is set to 1300 nm or less, the increase of the bending loss in 1.55 μm band can not be avoided.

Also, the reduced dispersion slope fiber, which does not have zero dispersion wavelength in the wavelength range of 1450 nm or more and which allows S-band (1450 nm–1530 nm) transmission in addition to C-band (1530 nm–1565 nm) and L-band (1565 nm–1625 nm) transmission, like TeraLight (trademark) of the Alcatel Co. for instance, is developed.

However, when optical amplification in such broadband is performed, the problem of overlapping of pumping band and the transmission band in S-band occurs. For instance, when EDFA is used as an optical amplifier, the pumping band is around 1480 nm. Since this pumping light may cause attenuation of the signal light transmitted in S-band, it is substantially difficult to use around 1480 nm as a transmission band.

The present invention is made considering the above-mentioned situation, and is aimed to provide an optical fiber suitable for WDM transmission both in the 1.55 μm wavelength band and in the wavelength range between 1400 nm and 1460 nm while ensuring the effective area to suppress the distortion of signal light caused by nonlinear phenomenon.

An optical fiber of the present invention is characterized by a dispersion of not less than 2 ps/nm/km and not more than 10 ps/nm/km at a wavelength of 1550 nm, an effective area of 65 $\mu m^2$ or more at a wavelength of 1550 nm, a positive dispersion slope at a wavelength of 1550 nm, a zero dispersion wavelength outside the wavelength range of 1400 nm to 1460 nm, an absolute value of a dispersion of not less than 2 ps/nm/km and not more than 10 ps/nm/km at a wavelength of 1400 nm, a cutoff wavelength of 1400 nm or shorter, and a transmission loss of 0.40 dB/km or less at a wavelength of 1400 nm.

The dispersion of the optical fiber of the present invention is preferably not less than −10 ps/nm/km and not more than −2 ps/nm/km at a wavelength of 1400 nm.

The zero dispersion wavelength of the optical fiber of the present invention lies preferably within the wavelength range of 1470 nm to 1510 nm.

The dispersion slope of the optical fiber of the present invention is preferably 0.085 ps/nm²/km or more at a zero dispersion wavelength.

An another optical fiber of the present invention is characterized by a zero dispersion wavelength between 1470 nm and 1510 nm, a dispersion of not less than 2 ps/nm/km and not more than 10 ps/nm/km at a wavelength of 1550 nm, an effective area of 65 $\mu m^2$ or more at a wavelength of 1550 nm, a positive dispersion slope at a wavelength of 1550 nm, and a wavelength bandwidth of 50 nm or shorter having a dispersion of not less than −2 ps/nm/km and not more than 2 ps/nm/km.

The above-mentioned embodiment according to the present invention can realize high-quality WDM transmission in both the 1.55 $\mu$m wavelength band and the wavelength range between 1400 nm and 1460 nm.

DESCRIPTION OF THE PREFERRED EMBODIMENT

Figure 1:
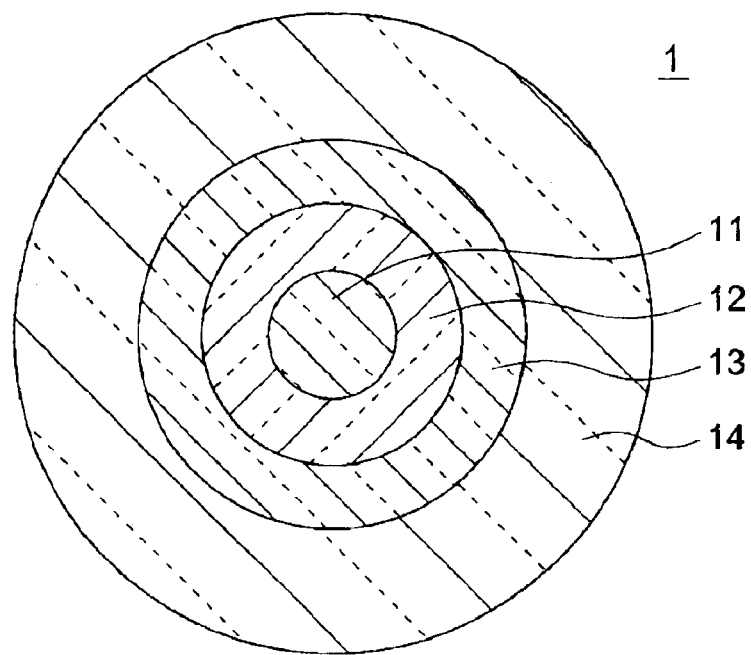
FIG. 1(A) and FIG. 1(B) show a cross-sectional view and the refractive index profile of an embodiment of the present invention, respectively.
Figure 1:
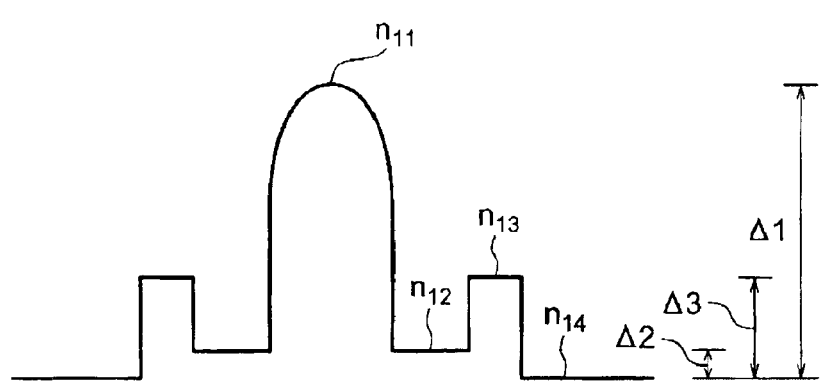
Figure 1:
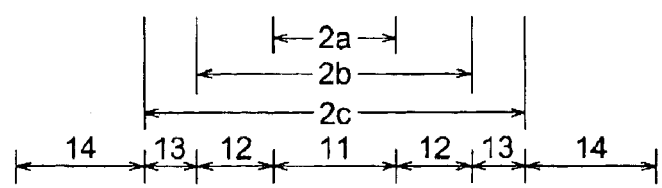

Preferred embodiments of the present invention are explained here after with reference to the figures.

An optical fiber of the present embodiment is characterized by a dispersion of not less than 2 ps/nm/km and not more than 10 ps/nm/km at a wavelength of 1550 nm, an effective area of 65 $\mu m^2$ or more at a wavelength of 1550 nm, a positive dispersion slope at a wavelength of 1550 nm, a zero dispersion wavelength outside the wavelength range of 1400 nm to 1460 nm, an absolute value of a dispersion of not less than 2 ps/nm/km and not more than 10 ps/nm/km at a wavelength of 1400 nm, a cutoff wavelength of 1400 nm or shorter, and a transmission loss of 0.40 dB/km or less at a wavelength of 1400 nm.

The effective area is expressed with following equation.

$$A_{eff} = 2\pi \left( \int_0^\infty E^2 r\, dr \right)^2 \bigg/ \left( \int_0^\infty E^4 r\, dr \right) \quad (1)$$

Here, "E" indicates the electric field accompanying the propagation light and "r" indicates the distance along the radial direction from the core center.

In addition, the cutoff wavelength is the cable cutoff wavelength $\lambda$ cc, as defined by ITU-T G. 650.

In general, when the effective area is small or the absolute value of the dispersion is small, the wave shape of the signal light is greatly distorted in the WDM transmission since the nonlinear phenomenon tends to generate easily. On the other hand, when the dispersion is too large, the wave shape of the signal light is greatly distorted by synergistic effect of the cumulative dispersion and the SPM.

Based upon the results of inventor's research, by using the optical fiber having the characteristics of dispersion of not less than 2 ps/nm/km and not more than 10 ps/nm/km at a wavelength of 1550 nm, effective area of 65 $\mu m^2$ or more at a wavelength of 1550 nm, and a positive dispersion slope at a wavelength of 1550 nm, it is possible to decrease the total wave distortion in the long-distance transmission and high-quality WDM transmission can be achieved in the 1.55 $\mu$m band.

The optical fiber of the present embodiment has a moderate dispersion and effective area of 65 $\mu m^2$ or more, to decrease the wave distortion of the signal light caused by the nonlinear phenomenon.

Moreover, the OH contaminant, which has an absorption peak around 1385 nm, often mixed into a conventional optical fiber as impurities. It is known that an optical fiber with these impurities shows a large transmission loss around 1385 nm. However, with the advancement of the manufacturing technology of optical fibers in recent years, the absorption loss around 1380 nm caused by the OH contaminant is made small enough to disregard its influence in causing transmission loss in 1400 nm. Moreover, it is necessary to avoid transmission around 1480 nm since this wavelength band serves as a wavelength band of the pumping light of the optical amplifier EDFA.

Therefore, the wavelength band of the WDM transmission of the optical fiber of the present embodiment is assumed to be 1400 to 1460 nm in addition to the 1.55 $\mu$m band.

The optical fiber of the present embodiment enables to realize the WDM transmission in the wavelength range between 1400 and 1460 nm in addition to the high-quality WDM transmission in 1.55 $\mu$m band, and hence the transmission wavelength band can be expanded.

Moreover, since the longer limit of the cutoff wavelength can be set to 1400 nm, the improvement of the bending loss can be expected.

Moreover, the optical fiber of the present embodiment has the dispersion of not less than −10 ps/nm/km and not more than −2 ps/nm/km at a wavelength of 1400 nm, preferably.

Also, the zero dispersion wavelength lies preferably within the wavelength range of 1470 nm to 1510 nm and the dispersion slope at the zero dispersion wavelength is preferably 0.085 ps/nm²/km or more.

On the other hand, conventional DSF has the dispersion of around −12 ps/nm/km at the wavelength of 1400 nm, the zero dispersion wavelength of 1530 nm to 1570 nm and the dispersion slope of around 0.07 to 0.08 ps/km/nm² at the zero dispersion wavelength.

Since the optical fiber of the present embodiment has the characteristics that are not so different from conventional DSF, it is possible to manufacture it using the refractive index profile and the manufacturing method of the conventional DSF, with a small change.

Moreover, by assuming the dispersion slope to be 0.085 ps/nm²/km or more, it is possible to narrow the width of the low dispersion wavelength range (the dispersion is −2 ps/nm/km to +2 ps/nm/km) as much as possible, and it is also suitable from the manufacturing and the characteristics viewpoint.

Next, the construction of the optical fiber of this embodiment having the above-mentioned characteristics is explained. FIG. 1(A) is a cross-sectional view of the optical fiber 1 concerning this embodiment, and FIG. 1(B) is a refractive index profile of such an optical fiber.

The optical fiber of the present embodiment comprises a central first core 11 having the highest refractive index, a second core 12 surrounding the first core 11, the refractive index of which is lower than that of the first core 11, a third core 13 surrounding the second core 12, the refractive index of which is lower than that of the first core 11 but higher than that of second core 12, and a cladding 14 surrounding the third core 13.

The refractive index $n_{11}$ of the first core 11, the refractive index $n_{12}$ of the second core 12, the refractive index $n_{13}$ of the third core 13, and the refractive index $n_{14}$ of cladding 14 are made to the condition of $n_{11}>n_{13}>n_{12}>n_{14}$. Moreover, the refractive index difference Δ 1 of the first core 11 with the cladding 14 is around 0.60%, the refractive index difference Δ 2 of the second core 12 with the cladding is around 0.01% and the refractive index difference Δ 3 of the third core with the cladding is around 0.14%. The above-mentioned refractive index differences Δ 1, Δ 2 and Δ 3 are expressed with following equations (2)–(4), respectively $$\Delta 1 = (n_{11} - n_{14})/n_{14} \times 100 \quad (2)$$

$$\Delta 2 = (n_{12} - n_{14})/n_{14} \times 100 \quad (3)$$

$$\Delta 3 = (n_{13} - n_{14})/n_{14} \times 100 \quad (4)$$

Moreover, when the optical fiber of which cladding 14 has the diameter of 124 μm to 126 μm is fabricated, the diameter "2a" of the first core 11, as shown in FIG. 1(B), is 7.4 μm, the diameter "2b" of the second core 12 is 9.0 μm and the diameter "2c" of the third core 13 is 19.0 μm, for instance.

The first core 11 and the third core 13 are formed by doping the element such as germanium (Ge), which increases the refractive index, to the pure silica ($SiO_2$).

The optical fiber having the above-mentioned characteristics can be realized by adjusting the refractive indices $n_{11}$, $n_{12}$ and $n_{13}$ and the diameters "2a", "2b" and "2c" of the first, second and third core respectively and the refractive index profile of the first core 11, etc.

In the optical fiber of the construction shown in FIG. 1, the refractive index, diameter, etc. of the first core, the second core and the third core were adjusted and the optical fiber was fabricated.

This optical fiber has a zero dispersion wavelength of 1500 nm, a dispersion slope of 0.091 ps/nm²/km at the zero dispersion wavelength, a dispersion of 2.6 ps/nm/km at 1530 nm, a dispersion of 4.3 ps/nm/km at 1550 nm, a dispersion of 5.8 ps/nm/km at 1565 nm, an effective area Aeff of 72 μm² at 1500 nm, and a cutoff wavelength of 1340 nm.

Moreover, wavelength at which the dispersion becomes +2.0 ps/nm/km is 1523 nm, and wavelength at which the dispersion becomes −2.0 ps/nm/km is 1475 nm, and the wavelength range in which the optical fiber has low dispersion of not less than −2 ps/nm/km and not more than 2 ps/nm/km is 48 nm.

Moreover, the dispersion is −4.3 ps/nm/km at 1460 nm and is −9.3 ps/nm/km at 1400 nm, the transmission loss is 0.39 dB/km at 1400 nm, and an optical fiber suitable for WDM transmission is obtained in both the 1.55 μm wavelength band and in the wavelength range between 1400 nm and 1460 nm.

As explained above in detail, the optical fiber of the present embodiment is characterized by a dispersion of 2 ps/nm/km to 10 ps/nm/km at a wavelength of 1550 nm, Aeff of 65 μm² or more, a positive dispersion slope, an absolute value of the dispersion of 2 ps/nm/km–10 ps/nm/km at a wavelength of 1400 nm, a cutoff wavelength of 1400 nm or shorter, and a transmission loss of 0.40 dB/km or less at a wavelength of 1400 nm.

As a result, the WDM transmission can be achieved in both the 1.55 μm wavelength band and in the wavelength range between 1400 nm and 1460 nm by ensuring the effective area sufficient enough to decrease the distortion of the signal light by the nonlinear phenomenon.

Figure 2:
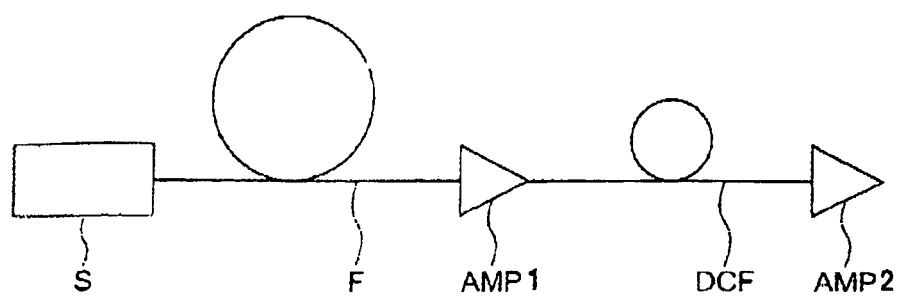
FIG. 2 is a diagram of a WDM transmission system of an embodiment of the present invention.

FIG. 2 is a diagram of the WDM transmission system in which the dispersion of the optical fiber of the present embodiment is compensated with the compensator. The signal from the signal light source S is transmitted by the optical fiber F concerning the present embodiment, amplified by the amplifier AMP 1 and then the dispersion is compensated by the dispersion compensating fiber DCF before being input to the next amplifier AMP 2.

By using this optical transmission system, the WDM transmission both in the 1.55 μm wavelength band and in the wavelength range between 1400 nm to 1460 nm can be achieved.

The present invention is not limited to the above-mentioned examples of the embodiment.

For example, the optical fiber may have the constructions and refractive index profiles other than that shown in the embodiment, satisfying the necessary characteristics.

Moreover, the optical transmission system can be composed without using the dispersion compensating optical fiber.

Additionally, various other forms, which do not deviate from the summary of the present invention, are possible.

By the present invention, the optical fiber suitable to realize WDM transmission both in the 1.55 μm wavelength band and in the wavelength range between 1400 and 1460 nm while securing the effective area sufficient enough to reduce the distortion of the signal light by the nonlinear phenomenon, is provided.

What is claimed is:

1. An optical fiber characterized by:

a dispersion of not less than 2 ps/nm/km and not more than 10 ps/nm/km at a wavelength of 1550 nm;

an effective area of 65 $\mu m^2$ or more at a wavelength of 1550 nm;

a positive dispersion slope at a wavelength of 1550 nm;

a zero dispersion wavelength outside the wavelength range of 1400 nm to 1460 nm;

a dispersion of not less than −10 ps/nm/km and not more than −2 ps/nm/km at a wavelength of 1400 nm to 1460 nm;

a cutoff wavelength of 1400 nm or shorter; and a transmission loss of 0.40 dB/km or less at a wavelength of 1400 nm.

2. The optical fiber of claim 1, wherein the zero dispersion wavelength within the wavelength range of 1470 nm to 1510 nm.

3. The optical fiber of claim 2, wherein a dispersion slope is 0.085 ps/nm$^2$/km or more at a zero dispersion wavelength.

4. An optical transmission system using the optical fiber of claim 1 as a transmission line.

5. The optical fiber of claim 1, comprising:

a central first core;

a second core surrounding the central first core, the refractive index of which is lower than that of the central first core;

a third core surrounding the second core, the refractive index of which is lower than that of the first central core but higher than that of the second core; and a cladding surrounding the third core, wherein the refractive index n11 of the first core, the refractive index n12 of the second core, the refractive index n13 of the third core, and the refractive index n14 of cladding are made to the condition of n11>n13>n12>n14.

* * * * *